United States Patent   (10) Patent No.: US 8,942,473 B2
Lin et al.                       (45) Date of Patent:     Jan. 27, 2015

(54) IMAGE PROCESSING METHOD AND DISPLAY APPARATUS

(76) Inventors: Ko Hung Lin, Hsinchu (TW); Yen Chuo, Taipei (TW); Yin Chun Lan, Wurih Township, Taichung County (TW)

( * ) Notice: Subject to any disclaimer, the term of this patent is extended or adjusted under 35 U.S.C. 154(b) by 95 days.

(21) Appl. No.: 13/507,726

(22) Filed: Jul. 25, 2012

(65) Prior Publication Data
US 2014/0029845 A1    Jan. 30, 2014

(51) Int. Cl.
*G06K 9/00* (2006.01)
(52) U.S. Cl.
USPC .......................................... 382/166
(58) Field of Classification Search
CPC ........... G06T 1/60; G06T 7/00; G06T 7/0081; G06T 11/40; G06T 15/405; G06T 2207/10016; G06T 2207/20104; H04N 1/411; H04N 1/415; H04N 1/64; H04N 19/00; H04N 19/00018; H04N 19/0006; H04N 19/00139; H04N 19/00157; H04N 19/00248; H04N 19/0026; H04N 19/00278; H04N 19/00309; H04N 19/00503; H04N 19/006; H04N 19/0063; H04N 19/0078; H04N 19/909; H04N 19/00945; H04N 19/00969; H04N 21/4725; H04N 21/4728; G11B 20/00007
See application file for complete search history.

(56) References Cited

U.S. PATENT DOCUMENTS

| 5,463,701 | A * | 10/1995 | Kantner et al. | 382/166 |
| 5,466,918 | A * | 11/1995 | Ray et al. | 235/380 |
| 6,498,606 | B1 * | 12/2002 | Penna et al. | 345/422 |
| 6,647,143 | B1 * | 11/2003 | Nakashima | 382/166 |
| 8,553,041 | B1 * | 10/2013 | Danskin | 345/530 |

* cited by examiner

*Primary Examiner* — Jose Couso

(57) ABSTRACT

A method and an apparatus for processing an image are provided. A buffer is provided and separated into a series of storage units. Each storage unit has a fixed size. The image is divided into pixel groups, and each pixel group corresponds to one storage unit. Each pixel group is compressed by one of candidate compression methods to obtain compressed data so that the compressed data of each pixel group fits the corresponding storage unit.

18 Claims, 6 Drawing Sheets

IMAGE PROCESSING METHOD AND DISPLAY APPARATUS

FIELD OF INVENTION

The present invention relates to an image processing method and a display apparatus and more particularly relates to an image processing method and a display apparatus that saves processing resource.

BACKGROUND

Portable devices are more and more popular today. For example, various mobile phones, tablets like iPad and laptop computers like ultrabook computers, have become daily tools for many people. In these portable devices, a display is common for providing information to users and is a major power consuming component. Because battery capacity is still a bottleneck for designing portable devices, energy saving is still a critical issue to consider.

SUMMARY OF INVENTION

According to one embodiment of the present invention, a method for processing an image includes the following steps. A buffer is provided and separated into a series of storage units. Each storage unit has a fixed size. The image is divided into a plurality of pixel groups, each pixel group corresponding to one of the storage units. Each pixel group is compressed by one of candidate compression methods to obtain first compressed data so that the first compressed data of each pixel group fitting the corresponding storage unit.

According to another embodiment of the present invention, a display apparatus includes a mapping device and a compressor. The mapping device divides the image into a plurality of pixel groups, each pixel group corresponding to one of storage units with a fixed size in a buffer. The compressor device compresses each pixel group by one of candidate compression methods to obtain first compressed data so that the first compressed data of each pixel group fitting the corresponding storage unit.

DETAILED DESCRIPTION

Figure 1:
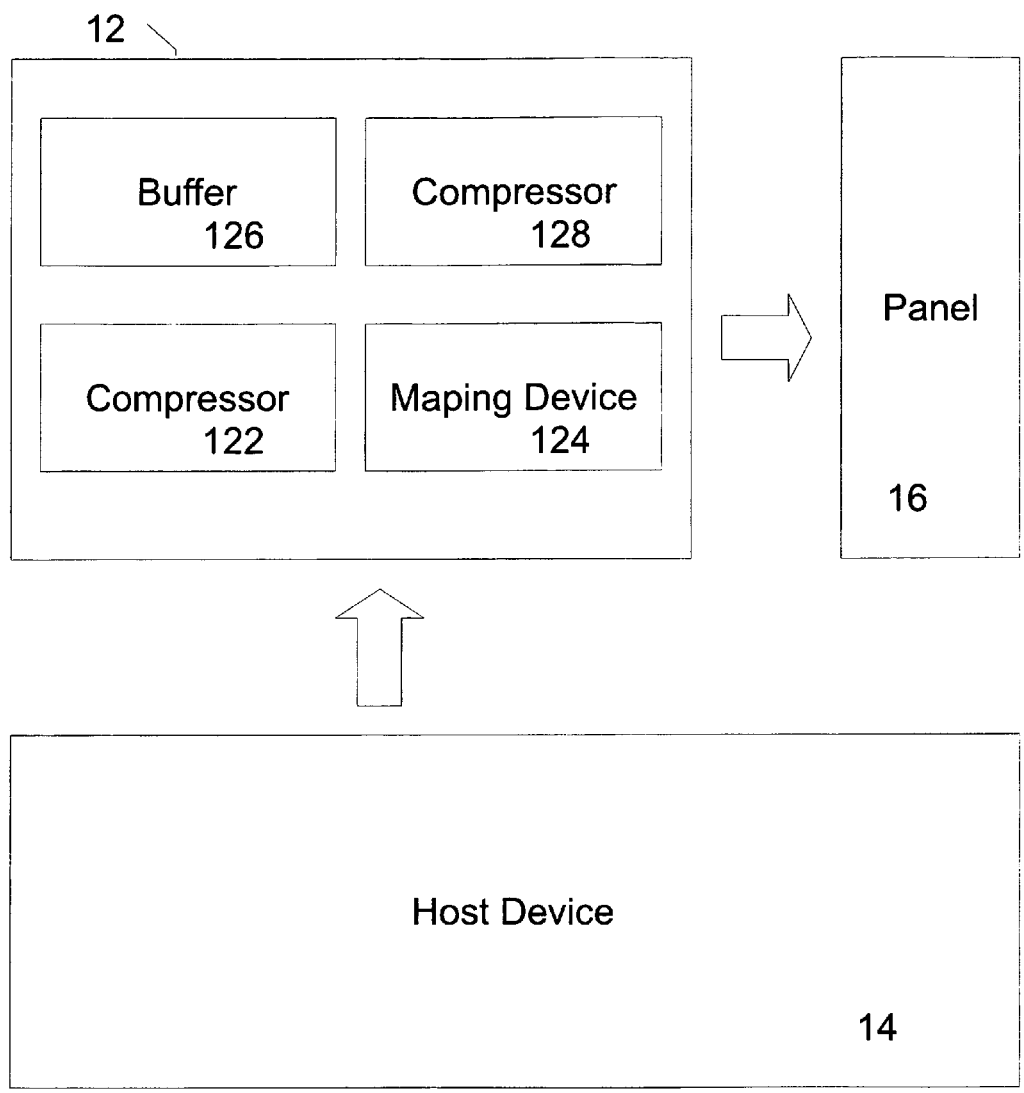
FIG. 1 illustrates an electronic apparatus as an embodiment according to the present invention.

Please refer to FIG. 1, which illustrates an embodiment according to the present invention.

In FIG. 1, an electronic apparatus includes a host device 14, a display device 12 and a panel 16. The host device 14 supplies image data to the display device 12 via a transmission link. The display device 12 renders output image on the panel 16 according to the image data.

FIG. 1 is used for explaining the embodiment, and persons of ordinary skilled in the art may apply the illustrated structure to various applications, like a mobile phone, a tablet computer, a notepad, a video recorder, a camera, a notebook computer, a multimedia player, a television, a settop box, or any electronic apparatuses that show images on an inner display or an external display.

For different design requirements and applications, the transmission link may be a mini-LVDS (low-voltage different signaling), a serial bus, a parallel bus or even a wireless link for sending image data to the display device 12 from the host device 14.

For different design requirements and applications, the display device 12 may have different forms. For example, the display device 12 may be combined with the panel 16 to form a panel module. In other words, a manufacturer may produce and sell the panel module to another manufacturer who assemblies the panel module to a host device, e.g. the motherboard of a mobile phone, to produce an end product, e.g. a mobile phone. For another example, the display device 12 may be integrated with the host device 14 as an integrated chip. In addition to the above mentioned examples, persons of ordinary skilled in the art should be able to practice the concept to other arrangements.

The display device 12 has a compressor 122, a mapping device 124, a buffer 126 and a decompressor 128. The image data from the host device 14 is compressed by the compressor 128 and compressed data are stored in the buffer to addresses determined by the mapping device 124. When timing satisfies certain condition, the decompressor 128 decompresses the compressed data so as to supply data to the panel 16 to display output image.

Figures 2A, 2B, 2C:
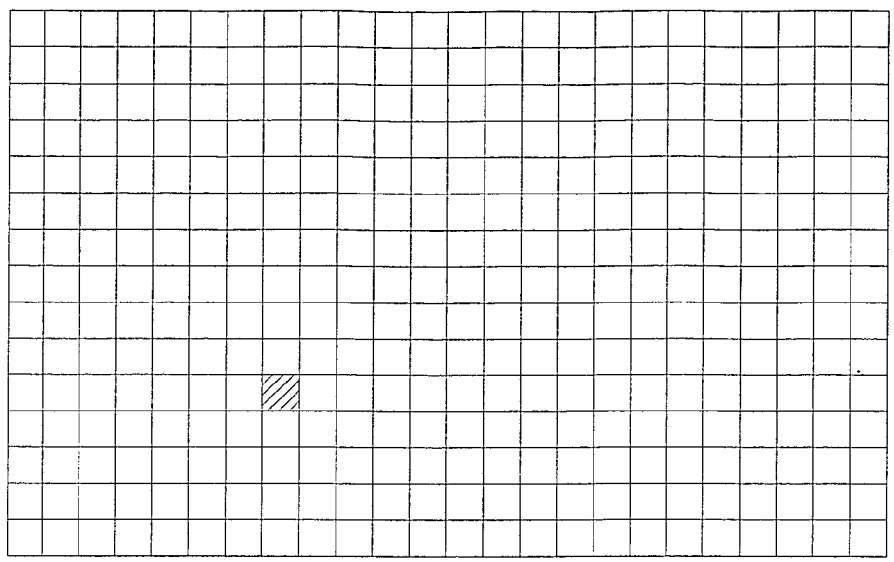
FIG. 2A illustrates an image being divided into a series of pixel groups.
FIG. 2B illustrates a pixel group that has four pixels.
FIG. 2C illustrates color components of a pixel group.

Next, please refer to FIGS. 2A, 2B and 2C.

FIG. 2A illustrates a two dimension panel. In this example, the pixels on the panel are divided into 360 (24×15) pixel groups, and each pixel group has four (2×2) pixels. Please be noted that the number of pixels in each pixel group and the number of pixel groups may be adjusted for different requirements.

FIG. 2B illustrates an enlarged diagram of a pixel group that is marked with shadow lines in FIG. 1. The pixel group in FIG. 2B includes four pixels, i.e. P1, P2, P3 and P4.

FIG. 2C illustrates three color components for the four pixel in the pixel groups of FIG. 2B. In this example, color information of each pixel is represented in red, green and blue color space. Therefore, each pixel, e.g. P1, has a red component, e.g. R1, a green component, e.g. G1, and a blue component, e.g. B1. For different panels, the resolutions may be different and different bits are needed to store color information. For example, each color component for a pixel may take 8 bits to represent strength in an associated color component. In such arrangement, there are 24 bits in total for a pixel and 96 (24×4) bits in total for a pixel group.

Figure 3:
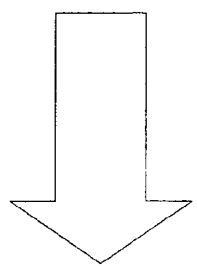
FIG. 3 illustrates color space conversion.

FIG. 3 illustrates conversion between the color space of Red, Green and Blue and the color space of Y, Cb, Cr, where Y is the brightness (luma), Cb is blue minus luma (B-Y) and Cr is red minus luma (R-Y). For brevity, conversion details between color spaces are not explained here, but persons of ordinary skilled in the art should know that color information may be stored as different color component combination in different color spaces.

Moreover, the image data sent from the host device 14 in FIG. 1 may be encoded in Red, Green and Blue color space, but the display device 12 may convert the image data into the color space of Y, Cb and Cr before compression is performed.

Figure 4:
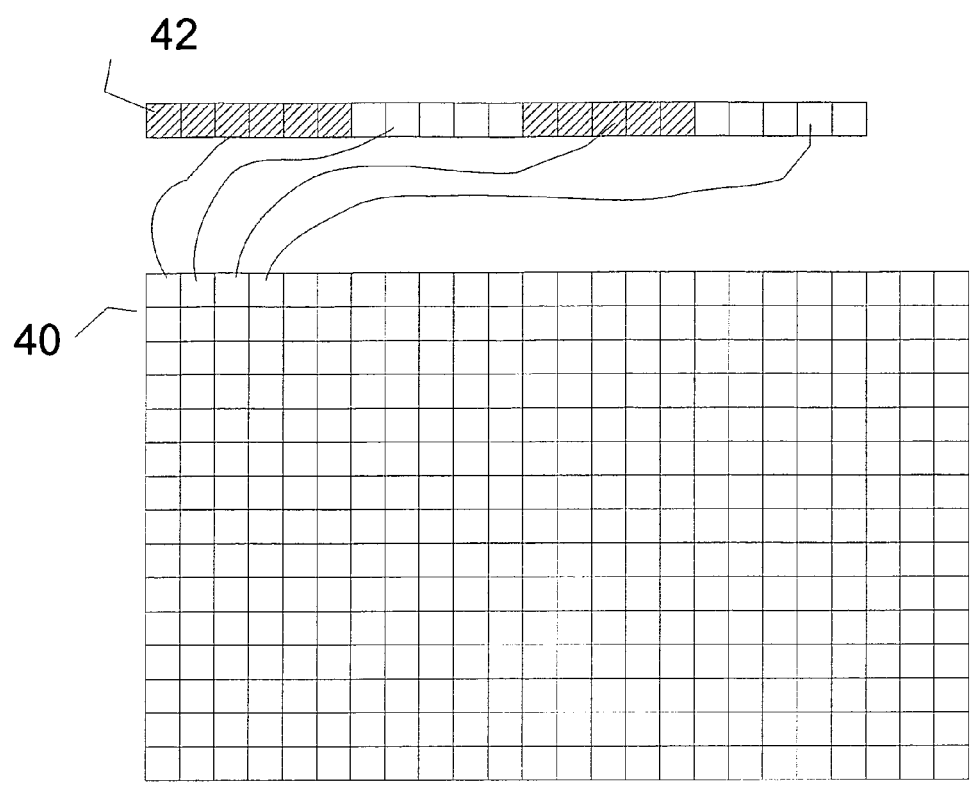
FIG. 4 illustrates relation between pixel groups and storage units.

Next, please refer to FIG. 4, which illustrates relations between pixel groups 40 and storage units in the buffer 126 of FIG. 1.

In FIG. 4, compressed data of each pixel group 40 are stored in a corresponding storage unit 42 in the buffer 126 of FIG. 1. In addition, the size of each storage unit is fixed. In other words, it is easy and fast to calculate an address of the buffer associated to a specific pixel group. Please be noted that the fixed size for storing each pixel group may be adjusted according to different design requirements. Generally, higher compression ratio decreases the fixed size necessary for storing compressed data of each pixel group.

For example, if original data of a pixel group have 12 bytes (8 bits/color component×3 color components×4 pixels/pixel group) and the compression ratio is set as 50%, at least 6 bytes are necessary for storing compressed data of each pixel group. The address for accessing 7th pixel group would therefore be 6×7 bytes from the beginning of the buffer.

In the embodiment, each pixel group may even be compressed by different compression methods. When such approach is applied, a mode indicator needs to be stored along with the compressed data for each pixel group. The size for storing the mode indicator depends on how many candidate compression methods are used. Theoretically, various compression methods, including loseless and lossy compression methods, may be chosen as the candidate compression methods. Persons of ordinary skilled in the art may find lots of information from books to choose data compression methods for their needs.

Several compression methods are provided here as examples but are not used as limitations for the present invention. First, the pattern for color components in a pixel group may be analyzed to find similarity between pixels to obtain compressed result. For example illustrated in FIG. 2C, if R1 equals to G1 and equals to B1, R2 equals to G2 and equals to B2, R3 equals to G3 and equals to B3 and R4 equals to G4 and equals to B4, only R1, R2, R3 and R4 need to be stored or to be further compressed to obtain the compressed data for the pixel group if a mode indicator indicating such pattern exists is stored at the same time.

For another example illustrated in FIG. 2C, if R1 equals to G3 and equals to B2, R2 equals to G4 and equals to B3, R3 equals to G1 and equals to B4, and R4 equals to G2 and equals to B1, still only R1, R2, R3 and R4 need to be stored or to be further compressed to obtain the compressed data for the pixel group if a mode indicator indicating such pattern exists is stored at the same time.

Yet for another example illustrated in FIG. 2C, if R1 is near G1 that equals to B1, and R2, R3, R4 equal to G2, G3, G4 that further equal to B2, B3, B4, in such case, G1, G2, G3 and G4 may be stored and a mode indicator indicating such pattern exists is stored along with G1, G2, G3 and G4.

It is therefore clear to understand that to categorize patterns of pixel groups itself is a type of compression, because storing a mode indicator indicating what pattern occurs is sufficient to restore original information instead of storing all redundant data.

Moreover, such compression methods may be combined with conventional compression methods. In other words, if only R1, R2, R3 and R4 need to be stored because G1, G2, G3, G4, B1, B2, B3 and B4 may be generated by reference to R1, R2, R3 and R4 according to an associated mode indicator, R1, R2, R3 and R4 may be further compressed to save space.

In addition, if a compression method is applied to compress a pixel group and the size of the compressed data is larger than the fixed size of a storage unit, i.e. not fit to the storage unit, certain information may be discarded. For example, certain bits of LSB (least significant bits) may be discarded before compression is applied.

Depending on different design requirements, e.g. hardware cost or complexity, multiple compression methods may be tested under a priority order to pick the compression method to compress a pixel group. In other words, a compression method A may provide best image quality but due to pixel information characteristic, applying the compression method A cannot achieve a predetermined compression ratio, a compression method B providing less image quality may be tested next. Please be noted that in addition to reference to the parameter of image quality, complexity or processing resource needed to perform a compression or other parameter may also be used to determine the priority order among candidate compression methods.

Besides, the candidate compression methods may be tested in serial or in parallel depending on hardware capacity. The number of candidate compression methods supported may also be considered because mode indicator may also occupy storage space. The mode indicators may be stored directly with compressed data, e.g. as headers. The mode indicators may also be stored separately in a different buffer.

Figure 5:
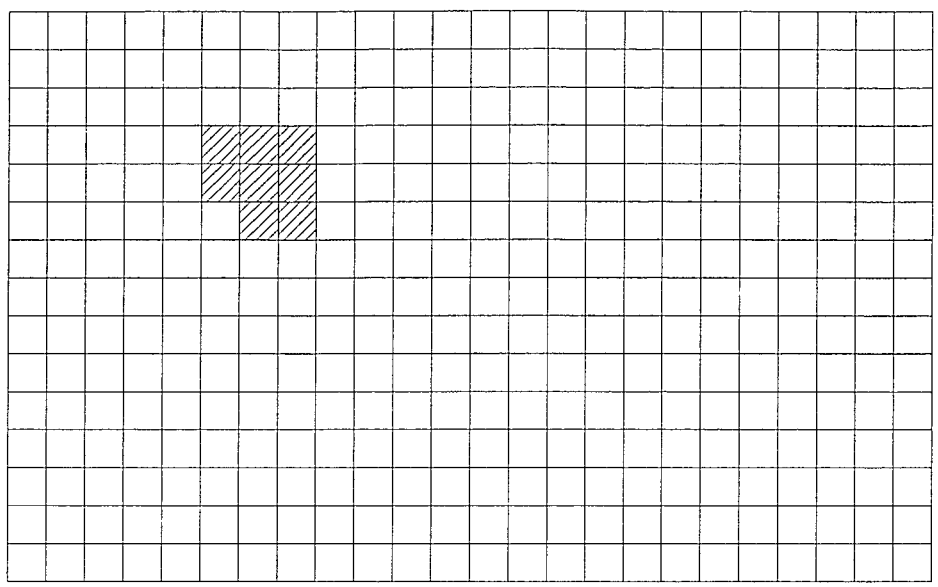
FIG. 5 illustrates only a portion of image is to be updated.

Next, please refer to FIG. 5, which illustrates a case that only a portion of the image is updated.

In the example of FIG. 5, only eight pixel groups of the image, instead of the whole image, are changed. It often happens in a mobile phone that a portion of image indicating a battery status or an incoming message needs to be changed. If such case happens, the host device 14 of FIG. 1 may only need to send updated image data of the eight pixel groups and their coordinates to the display device 12 of FIG. 1.

Figure 6:
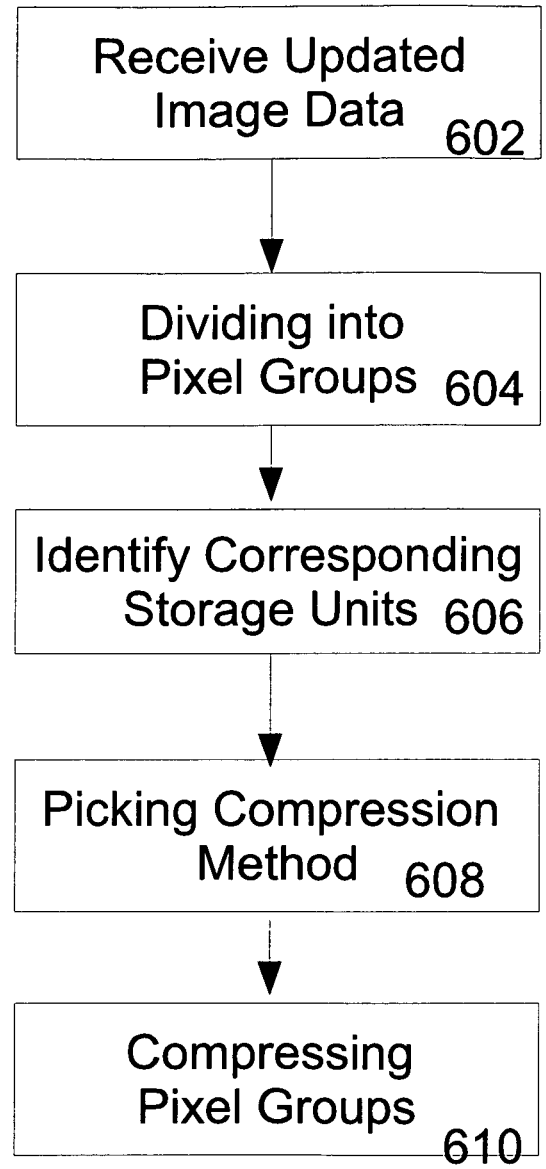
FIG. 6 illustrates a flowchart for updating the image.

FIG. 6 illustrates what happens when the display device 12 receives the updated image data (step 602). The updated image data are divided into pixel groups as explained above (step 604). Because the storage unit of the buffer has a fixed size, it is easy and fast to identify addresses of corresponding storage units (step 606). Because compression method is picked on pixel group basis, a proper compression method is selected for compressing each pixel group that needs to be updated (step 608). Finally, the pixel groups are compressed (step 610) and the updated compressed result are stored in corresponding storage units of the buffer.

By using the above mentioned approach, only a portion of the image needs to be updated. Bandwidth between the display device and the host device is saved. In addition, computation resource is also saved and that usually save more precious energy to keep an electronic apparatus to keep alive longer under limited battery capacity.

Please be noted that the above mention methods and devices may be implemented by firmware, software, hardware or their various combination based on different design requirements. For example, the mapping device 124 may be composed of certain firmware codes running by a controller or be implemented as associated hardware logic circuit. Each of the compression methods may be implemented as software instructions running on hardware of the host device or of the display device or their combination. For various approaches who follow the spirit of the invention based on disclosure of the present invention should be regarded falling within the scope of the present invention.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for processing an image from an image processor, comprising:
    providing a buffer separated into a series of storage units, each storage unit having a fixed size;
    dividing the image into a plurality of pixel groups by a processor, each pixel group corresponding to one of the storage units;
    compressing each pixel group by one of candidate compression methods to obtain first compressed data so that the first compressed data of each pixel group fitting the corresponding storage unit; and
    updating a portion of the image by a processor by:
    receiving updated image data by a processor corresponding to the portion of the image;
    dividing the updated image data by a processor into updated pixel groups;
    identifying the storage units by a processor corresponding to the updated pixel groups; and
    compressing each updated pixel group to obtain second compressed data by one of the candidate compression methods so that the second compressed data fits in the corresponding storage unit.

2. The method of claim 1, wherein pixel pattern of each pixel group are analyzed to pick said one of the candidate compression methods.

3. The method of claim 2, wherein color components of the pixel pattern of each pixel group are examined to determine whether similarity exists among color components to pick said one compression method for each pixel group.

4. The method of claim 3, wherein if similarity among color components is found existed, redundant bits in color components are not stored repeatedly.

5. The method of claim 1, wherein a plurality of the candidate compression methods are tested for each pixel group to find said one compression method to obtained the compressed data for each pixel group.

6. The method of claim 1, wherein a mode indicator for each pixel group is stored to indicate said one corresponding compression method applied to each pixel group to generate the compressed data stored in the corresponding storage unit.

7. The method of claim 1, wherein pixel groups not corresponding to the portion of the image to be updated are not processed to save processing resource.

8. The method of claim 1, wherein the steps of processing the image are performed in a display panel module.

9. The method of claim 8, wherein the display panel module receives an updated portion of the image from a host device via a transmission link.

10. A display apparatus, comprising:
    a mapping device dividing the image into a plurality of pixel groups, each pixel group corresponding to one of storage units with a fixed size in a buffer;
    a compressor device for compressing each pixel group by one of candidate compression methods to obtain first compressed data so that the first compressed data of each pixel group fitting the corresponding storage unit; and
    updating a portion of the image by:
    receiving updated image data corresponding to the portion of the image;
    dividing the updated image data into updated pixel groups;
    identifying the storage units corresponding to the updated pixel groups; and
    compressing each updated pixel group to obtain second compressed data by one of the candidate compression methods so that the second compressed data fits in the corresponding storage unit.

11. The display apparatus of claim 10, wherein pixel pattern of each pixel group are analyzed to pick said one of the candidate compression methods.

12. The display apparatus of claim 11, wherein color components of the pixel pattern of each pixel group are examined to determine whether similarity exists among color components to pick said one compression method for each pixel group.

13. The display apparatus of claim 12, wherein if similarity among color components is found existed, redundant bits in color components are not stored repeatedly.

14. The display apparatus of claim 10, wherein a plurality of the candidate compression methods are tested for each pixel group to find said one compression method to obtained the compressed data for each pixel group.

15. The display apparatus of claim 10, wherein a mode indicator for each pixel group is stored to indicate said one corresponding compression method applied to each pixel group group to generate the compressed data stored in the corresponding storage unit.

16. The display apparatus of claim 10, wherein pixel groups not corresponding to the portion of the image to be updated are not processed to save processing resource.

17. The display apparatus of claim 10, wherein the display apparatus is a display panel connected to a host device.

18. The display apparatus of claim 10, wherein the display apparatus is a portable electronic device.

* * * * *